Nov. 20, 1951 F. KAUSCH 2,575,876
FILTER APPARATUS
Filed April 3, 1950 2 SHEETS—SHEET 1
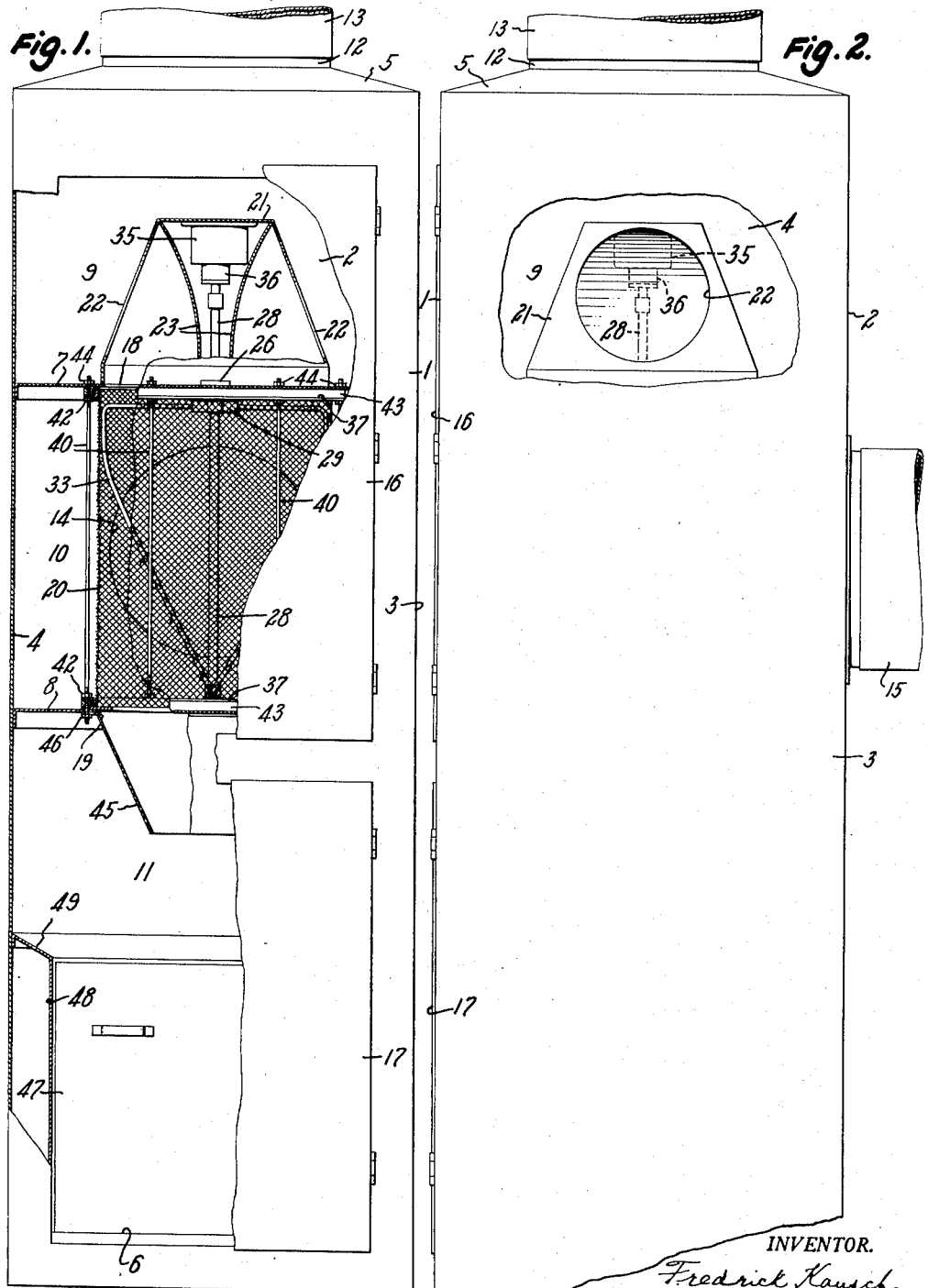
INVENTOR.
Fredrick Kausch
BY
Attorney.

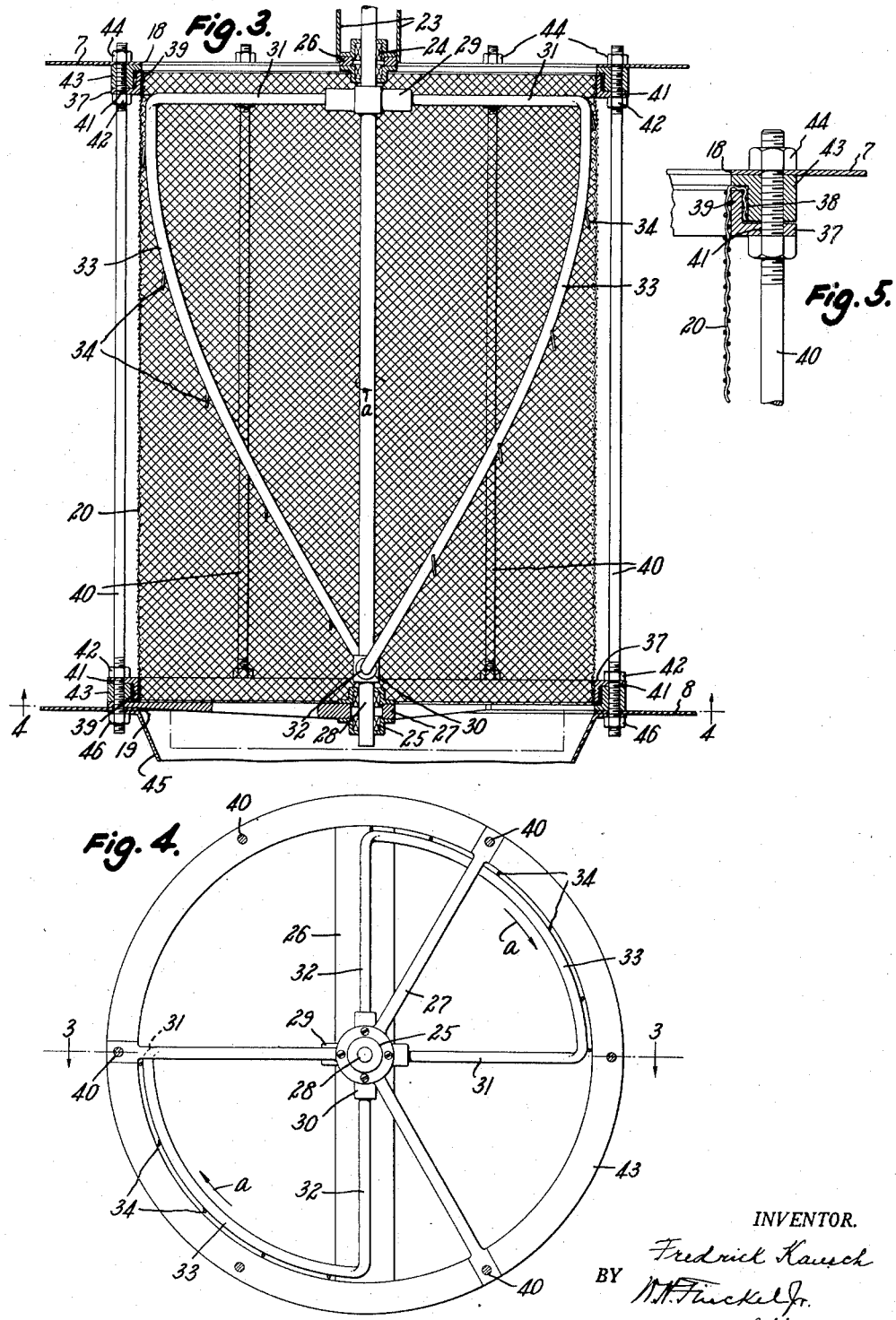

Patented Nov. 20, 1951

2,575,876

UNITED STATES PATENT OFFICE 2,575,876

FILTER APPARATUS

Fredrick Kausch, Jersey City, N. J.

Application April 3, 1950, Serial No. 153,577

2 Claims. (Cl. 183—60)

This invention relates broadly to filter apparatus, and it has special reference to apparatus for filtering lint, fibres, threads, dust, hairs, wool, fur and other light, air-borne material from an air stream.

One object of the invention is to provide filter apparatus particularly adapted to the purpose of removing lint, fibres, threads, dust and other air-borne materials from the air exhausted from suction fans associated with various industrial apparatus such as are used, for example, in laundries, dry cleaning plants, textile mills, wool processing plants, wood dressing mills, and in other industries where light materials are normally carried off by exhaust fan installations, to thereby eliminate such materials from the air of the rooms and thus improve working conditions.

Another object is to provide a filter apparatus of relatively simple construction and few parts, capable of being comparatively inexpensively installed and serviced.

A further object is to provide filter apparatus furnished with means for automatically maintaining the main filtering medium in unobstructed condition and thus capable of continuous operation for extended periods of time.

A still further object is to provide filter apparatus in which provision is made for ready access to operative parts for inspection, repair and replacement.

The invention comprises filter apparatus including a housing having an air inlet compartment for communication with a source of laden air, a filtering compartment furnished with a filter member and connected with an exhaust passage, means for automatically maintaining the filter member in unobstructed condition for proper functioning including a rotative sweep mechanism carrying specially designed agitator fingers, and a collection compartment into which the material collected from the air by the filter member may be discharged and collected and preferably provided with a removable bin or receptacle for facilitating disposal of such material, all as will be explained hereinafter more fully and finally claimed.

In the accompanying drawings illustrating the invention, in the several figures of which like parts are similarly designated, Fig. 1 is a partial sectional front elevation of filter apparatus embodying the invention, Fig. 2 is a side elevation of the apparatus, viewed from the right of Fig. 1, with a portion of the housing broken away, Fig. 3 is an enlarged sectional view of the filter member and its mounting in the housing, taken on the line 3—3 of Fig. 4, Fig. 4 is a bottom view of the filter member proper, taken on the line 4—4 of Fig. 3, and Fig. 5 is a further enlarged fragmentary detail view illustrating a preferred manner of assembling elements of the filter member.

The housing for the apparatus, which is preferably rectangular in lateral cross section, includes a front wall 1, back wall 2, side walls 3 and 4, and top and bottom walls 5 and 6, respectively, and is divided in its interior by upper and lower horizontal partitions 7 and 8, respectively, so as to form the three chambers or interior compartments, namely the inlet compartment 9, the filtering compartment 10 and the collection compartment 11.

The top wall 5 is provided with a conduit connection 12 to which is joined a conduit 13 leading to the source of air to be filtered, such, for example, as the exhaust of a blower for inducing a current of drying air through a laundry drier, and serving to conduct the laden air to the inlet compartment 9 of the filter apparatus, and the back wall 2 has an outlet opening 14 in communication with the filtering compartment 10 and an outlet conduit 15 preferably connected with an exhaust fan (not shown).

The front wall 1 is furnished with doors 16 and 17 whereby access may be had to the several compartments 9, 10 and 11.

The partitions 7 and 8 are provided with circular openings 18 and 19, respectively, axially aligned vertically of the housing, and extending between these openings is a cylindrical filter screen 20 which closes the inlet compartment 9 from the filtering compartment 10, and particularly from the outlet 14 thereof, except through the interstices of the screen. Above the upper partition 7, and arranged over its opening 18, is a hood or shield 21 provided in its opposite walls with apertures 22 through which laden air is admitted into the interior of the filter screen 20 through the partition opening 18, baffles 23 being provided to effectively direct the flow of such air.

Mounted in suitable bearings 24 and 25 secured to a supporting plate 26 and a spider 27 at the upper and lower partitions 7 and 8, respectively, is a shaft 28 carrying adjacent to the upper and lower bearings 24 and 25 fixed hub members 29 and 30, respectively, to which are secured the radially extending inner ends 31 and 32, respectively, of spirally-formed sweep arms 33 (see particularly Figs. 3 and 4), and each of these sweep arms is provided with a plurality of longitudinally spaced agitator fingers 34 made preferably of relatively fine, substantially rigid wire, such as brass wire of about $\frac{3}{32}$" diameter, the separation of these fingers on the respective sweep arms being such that they will travel in different circular paths with respect to the interior surface of the filter screen 20 when the shaft 28, with the sweep arms 33, is rotated at predetermined appropriate speed by a conventional electric motor 35 having a speed regulating geared head 36.

In the construction and mounting of the filter screen 20 the following parts and method of assembly are employed. First, preferably upon a cylindrical mandrel or form of proper diameter to produce a cylindrical screen appropriate to the size of filter apparatus in which it is to be installed, a sheet of screen wire cloth of proper length and width is shaped to the cylindrical contour of the mandrel or form and its meeting edges joined in a seam by means of a metal binding strip or otherwise appropriately. Then a ring 37 of L cross section (Figs. 3 and 5) is slipped over each end of the screen cylinder a distance sufficient to provide an overlapping portion 38 which is slightly curled over the outer edge 39 of the ring at each end. Then a plurality of threaded stretcher and securing rods 40 (six as shown) are arranged in the openings 41 provided for them in the rings 37, and previously applied stretching and clamping nuts 42 are adjusted upon the rods to preliminary holding position. Thereafter, substantially similar clamping rings 43 are slipped over the partially curled edges of the ends of the screen member with rod receiving openings engaging the rods 40 and forced toward the previously applied rings 37 to clamp the edges of the screen between the mating flanges of the pairs of rings 37, 43. Next, the spider 27 is applied to the outwardly projecting ends of the rods 40 at one end of the screen, and this assembly is then ready for installation in the housing of the apparatus between the partitions 7 and 8. It will be understood that these partitions are provided, bordering their openings 18 and 19, with holes to receive the ends of the rods 40, and when the filter screen assembly is positioned between the partitions the ends of the rods will be passed through these holes. Thereafter, the nuts 42 will be run home against the rings 37 until the filter screen is drawn taut and the outer complemental rings 43 are in tight abutting relation to the inner opposed faces of the partitions 7 and 8. When thus arranged, clamping nuts 44 will be applied at the upper ends of the rods and tightened against the upper face of the partition 7, a funnel or chute member 45 will be positioned upon the lower ends of the rods 40 and in contact with the under face of the lower partition 8, and nuts 46 applied to these lower ends of the rods are tightened up to hold the parts in place.

As shown in Fig. 1, the collection compartment 11 may be, and preferably is, provided with a removable bin or receptacle 47, and a false wall 48 and slanting lip 49 are attached to the housing to direct into this receptacle material falling from the funnel or chute 45.

In operation, assuming that means, such as an exhaust fan connected with the conduit 15, are provided for insuring proper forced or induced circulation of air through the inlet and outlet compartments 9 and 10, respectively, and that the motor 35 is energized to impart rotation to the sweep arms 33, it will be apparent that the passage of laden air will be from the inlet compartment 9 through the openings 22 in the hood 21 and the opening 18 of the upper partition 7 into the interior of the filter screen 20 and outwardly through the interstices thereof to the filter compartment 10 and outlet 14.

Lint, fibres, threads and other air-borne materials will be caught by the filter screen, and that which does not adhere to the inner surface of the screen will drop through the chute 45 into the bin 47 in the collecting compartment. Such material as adheres to the interior surface of the screen will be loosened and swept therefrom by the rotating sweep arms 33 and will also fall into the collecting compartment. In this clearing sweeping action the agitator fingers 34 play an important part. They are, as hereinbefore intimated, of a relatively rigid nature, and they do not contact with the filter screen during rotation of their carrying sweep arms 33, but are spaced therefrom approximately $\frac{1}{16}$" and thus will not injure the screen. However, they will perform a sweeping action with respect to the screen adequate to dislodge that material with which they come in contact and other material closely adjacent to it or entangled or intermingled with it. Moreover, by virtue of the spacing of the fingers 34 from the filter screen, a slight deposit of lint or fibres may be left adhering to the screen, and this will serve to arrest the passage of dust and other fine air-borne material through the same.

It will be noted, moreover, that the spiral formation of the sweep arms 33 and their direction of rotation, as indicated by the arrows a in Figs. 3 and 4, will have a screw feed action tending to force collected material toward the chute 45.

Obviously, the construction, mode of assembly, and form of installation of the filter screen 20 make its inspection, removal, repair and replacement relatively easy and expeditious.

Also, the construction of the apparatus and the materials used therein, particularly as regards the housing and the replaceable filter screen and its connections, are of a simple and inexpensive nature, thus providing for low manufacturing, installation and servicing costs.

Various changes and modifications are considered to be within the principle of the invention and the scope of the following claims.

What is claimed is:

1. In filter apparatus for removing entrained materials from air, means providing a filter member in communication with an inlet for laden air and an outlet for cleaned air and interposed therebetween in such a manner as to insure that all incoming air which reaches said outlet will pass through said filter member, said filter member comprising a foraminous cylinder to which air-borne material may adhere, and means for clearing said filter member of the thus adhering material including a rotating shaft arranged axially of said filter member and a pair of similar spiral sweep arm members carried by said shaft and provided with a plurality of individual relatively widely spaced substantially rigid agitator fingers of filar form terminating short of contact with said filter member and adapted to engage the said adhering material, the relative spacing of the agitator fingers upon the two sweep arm members being such as to cause them to travel in separate non-intersecting circular paths relatively to the filter member as the said sweep arm members rotate.

2. In filter apparatus, a cylindrical tubular filter member formed of wire cloth, and means for mounting and maintaining said member in taut cylindrical condition, including pairs of complemental L-shaped ring means arranged exteriorly of the filter member for crimping between them and clamping the peripheral edges of said wire cloth at both ends of said member, and stretcher rod means comprising a circular series of rods having their end portions screw-threaded and carrying nuts for engaging the inner and outer faces of the assembled clamping rings at opposite ends of the filter member, the nuts in engagement with the inner opposed faces of said pairs of assembled clamping rings being adjustable to impose a stretching action upon said wire cloth longitudinally of said filter member.

FREDRICK KAUSCH.

REFERENCES CITED

The following references are of record in the file of this patent:

UNITED STATES PATENTS

| Number | Name | Date |
|---|---|---|
| 422,957 | Martin | Mar. 11, 1890 |
| 1,281,142 | Cox | Oct. 8, 1918 |
| 1,738,717 | Matlock | Dec. 10, 1929 |
| 1,829,068 | Smith | Oct. 27, 1931 |
| 2,332,413 | Teague | Oct. 19, 1943 |

FOREIGN PATENTS

| Number | Country | Date |
|---|---|---|
| 269,707 | Great Britain | Apr. 28, 1927 |